(12) United States Patent
Marioni

(10) Patent No.: US 8,002,226 B2
(45) Date of Patent: Aug. 23, 2011

(54) ACCESSORY DEVICE ASSEMBLY FOR AN AQUARIUM, PARTICULARLY HEATER ASSEMBLY

(75) Inventor: Elio Marioni, Dueville (IT)

(73) Assignee: Askoii Holding S.r.l. (IT)

( * ) Notice: Subject to any disclaimer, the term of this patent is extended or adjusted under 35 U.S.C. 154(b) by 254 days.

(21) Appl. No.: 12/434,908

(22) Filed: May 4, 2009

(65) Prior Publication Data
US 2009/0289156 A1    Nov. 26, 2009

(30) Foreign Application Priority Data

May 20, 2008    (EP) .................................... 08425358

(51) Int. Cl.
*A47B 96/00* (2006.01)
*A47K 1/00* (2006.01)
*A47K 5/00* (2006.01)
*E04G 5/06* (2006.01)

(52) U.S. Cl. ............ 248/222.12; 248/206.3; 248/220.21; 248/224.61; 248/224.7

(58) Field of Classification Search ............. 248/222.12, 248/224.61, 316.7, 224.7, 220.21, 206.3
See application file for complete search history.

(56) References Cited

U.S. PATENT DOCUMENTS

| | | | |
|---|---|---|---|
| 3,160,384 A | 12/1964 | Cirese | |
| 3,717,253 A * | 2/1973 | Lovitz | 210/167.27 |
| 3,731,058 A * | 5/1973 | Bleiweiss | 219/523 |
| 4,152,263 A | 5/1979 | Goldman et al. | |
| 4,255,648 A * | 3/1981 | Willinger et al. | 219/523 |
| 4,907,772 A * | 3/1990 | Willinger | 248/231.71 |
| 5,435,511 A | 7/1995 | Hsu | |
| 2007/0257168 A1 | 11/2007 | Friedrichs | |

\* cited by examiner

*Primary Examiner* — Amy J Sterling
(74) *Attorney, Agent, or Firm* — Akerman Senterfitt

(57) ABSTRACT

An accessory device (1) for an aquarium is described, in particular for a thermal heater (2), which may be vertically positioned. It comprises an accessory device (2) for operation of said aquarium and supporting means (4, 5) for supporting the accessory device (2) on a wall of the aquarium tank. The supporting means (4, 5) comprise a supporting body (4) which may be attached to the aquarium wall and latching means (5, 10), which are integral with the accessory device (2) and may be removably associated with said supporting body (4). The supporting body (4) supports the latching means (5, 10) and the accessory device (2) and allows selection of vertical position of accessory device (2) with respect to supporting body (4).

10 Claims, 12 Drawing Sheets

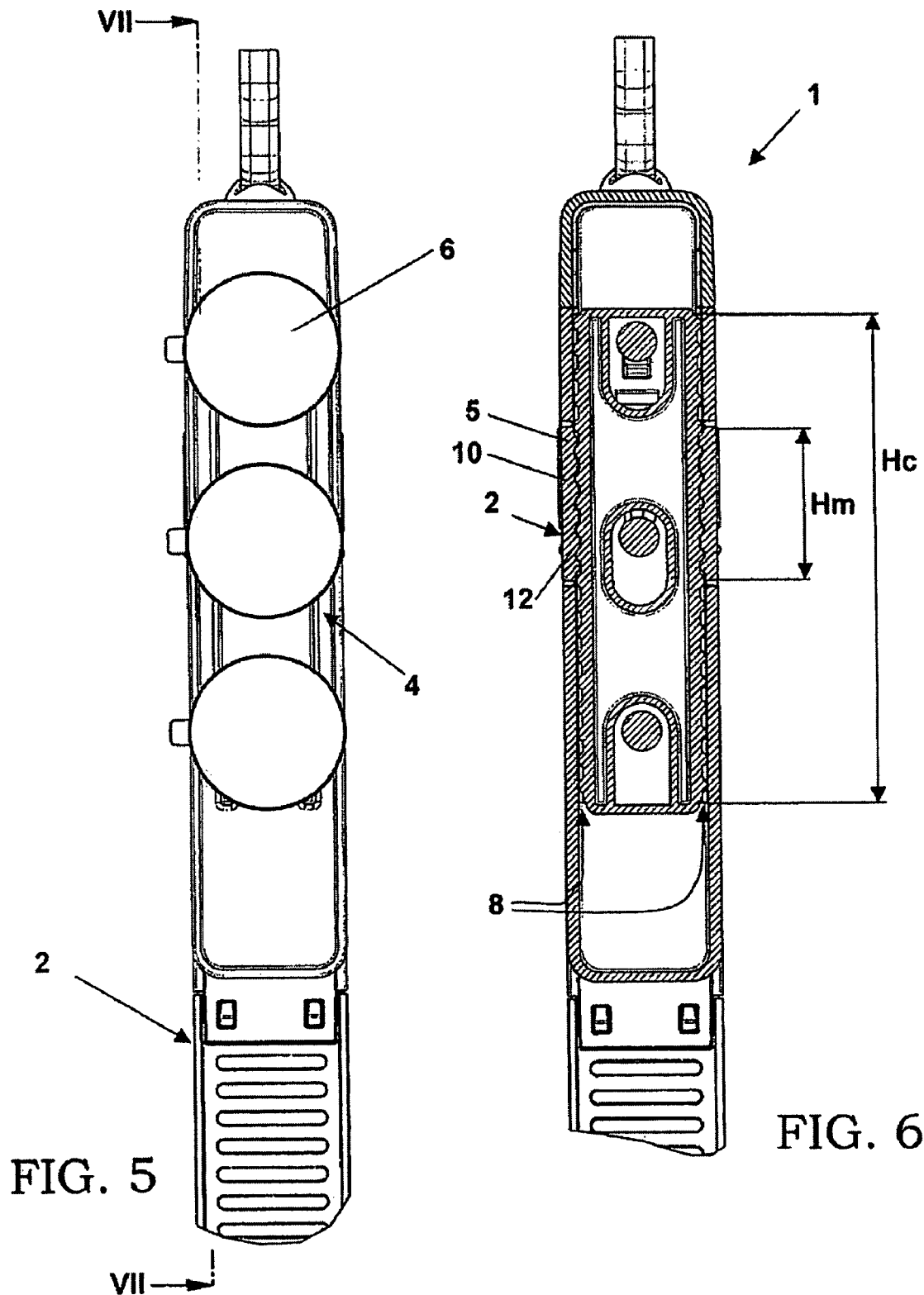

ACCESSORY DEVICE ASSEMBLY FOR AN AQUARIUM, PARTICULARLY HEATER ASSEMBLY

FIELD OF THE INVENTION

The present invention relates to an accessory device assembly for an aquarium, in particular a thermal heating assembly (heater).

KNOWN ART

As is known, an aquarium is normally provided with accessory devices. An accessory device, in this context, comprises a component which allows one or more specific aquarium functions. Often, an accessory device comprises an external enclosure, in which the equipments of the accessory device are substantially enclosed.

Generally, an accessory device has to be attached on the aquarium tank. Therefore an accessory device needs supporting means, in order to support and fixedly hold the accessory device on a tank wall.

In this context, the term "accessory device assembly" is intended to encompass an arrangement which comprises the accessory device and its corresponding supporting means.

A particular example of an accessory device is represented by a thermal heater, whose function is to heat the liquid (water) in order to bring it to a temperature required for fish vital functions. A thermal heater has heating means, comprising for example a resistor provided for dissipating electric energy as heat, and which is enclosed inside an ampoule, which is usually made of glass material, and contacts the liquid contained in the tank, in order to enable transfer of generated heat through the ampoule glass towards said liquid.

The thermal heater usually comprises an enclosure of plastic material for housing said ampoule. Said enclosure is usually integral with said supporting means, which in turn support said thermal heater on an internal wall of tank.

The thermal heater is generally defined by a lower and an upper portion. Said upper portion is to be positioned above liquid level and usually comprises components, whose submersion is not foreseen or required; for example, said upper portion usually comprises input means, e.g. keys, for manually adjusting the thermal heater. On the contrary, the lower portion is to be submerged in the liquid, and comprises the ampoule, or the lower part of the ampoule, which has to be in contact with the liquid, in order to allow heat transfer from the ampoule to the liquid.

Sometimes, the liquid level is changed, by adding or removing liquid to and from the interior of the tank, and therefore the thermal heater has to be repositioned in a higher or lower area of the tank.

If the thermal heater is fixed to walls by means of suction cups, a repositioning is impossible once said suction cups have been submerged.

This also holds true for other accessory devices, which have to be repositioned at different heights, and which are mounted on the aquarium tank.

The technical problem underlying the present invention is to find an accessory device assembly, in particular a thermal heater device, having such features to make it possible a vertical repositioning for the accessory device.

SUMMARY OF THE INVENTION

According to the invention, this technical problem is solved by an accessory device assembly for an aquarium, said accessory device assembly comprising an accessory device for executing functions required for the aquarium and supporting means for supporting and fixing the accessory device to a wall of the aquarium tank, wherein said supporting means comprise a separate supporting body attachable to said wall, and latching means integral with said accessory device, which are removably attachable to said supporting body, so that the supporting body is capable to support the latching means and the accessory device, and moreover for allowing selection of vertical position of accessory device with respect to said supporting body.

In particular, the accessory device is a thermal heater, but may also be some other type of accessory device.

According to the invention, the supporting means of the accessory device assembly are defined by a supporting body, which is to be attached, for example by means of suction cups, to the aquarium wall, and latching means, integral with the accessory device, which are attached to the supporting body.

Preferably, the supporting body comprises latching counter-means which are capable to be engaged by said latching means, in order to fix said accessory device. Advantageously, a shape fit is realizable between the latching means and the latching counter-means, in order to fix the accessory device in the set position.

Preferably, the latching counter-means have a vertical extension substantially greater than a vertical extension of said latching means, so that to allow selection of a portion of latching counter-means and consequent definition of vertical position of accessory device. In this way, it is possible to vertically scroll through the latching means and choose on which part of counter-means the latching means have to be attached: an easy setting of vertical position of accessory device is thus enabled.

According to a preferred embodiment, latching counter-means comprise at least a supporting indentation (in particular a vertical row of protrusions, provided in a side of supporting body) and latching means comprise at least a latching indentation complementary shaped with respect to said supporting indentation, so that the latching means are attachable to the supporting body.

In particular, the latching counter-means are comprised of two supporting indentations; the latching means are comprised of two parallel vertical latching plates, on which an elastic restoring force is exerted, which tends to force them to return in a parallel position; each latching plate being comprised of a lever hinged to a respective pivot (in particular it may be comprised of an elastically deformable integral bridge between the accessory device and latching plates), which separates a selection half-plate from an opposed latching half-plate, which provide arms of said lever; each latching plate comprising a latching indentation complementarily shaped to a respective support indentation provided in said supporting body. An approaching movement between the selection half-plates entails a separating movement of latching half-plates, so that to allow latching of latching means to said supporting body. Therefore, the accessory device are lockable with said supporting body when said vertical latching plates are parallel; moreover, the release of the accessory device from the supporting body is made easy, when vertical latching plates are diverging.

These, and further characteristics and related advantages will become more apparent from following description, regarding some preferred examples, which are only illustrative and non limiting with respect to appended drawings.

BRIEF DESCRIPTION OF THE DRAWINGS

In the drawings:

FIG. 5 shows a rear view of accessory device assembly of FIG. 1;

FIG. 6 shows a section view along line VI-VI of FIG. 4;

DETAILED DESCRIPTION

Figure 1:
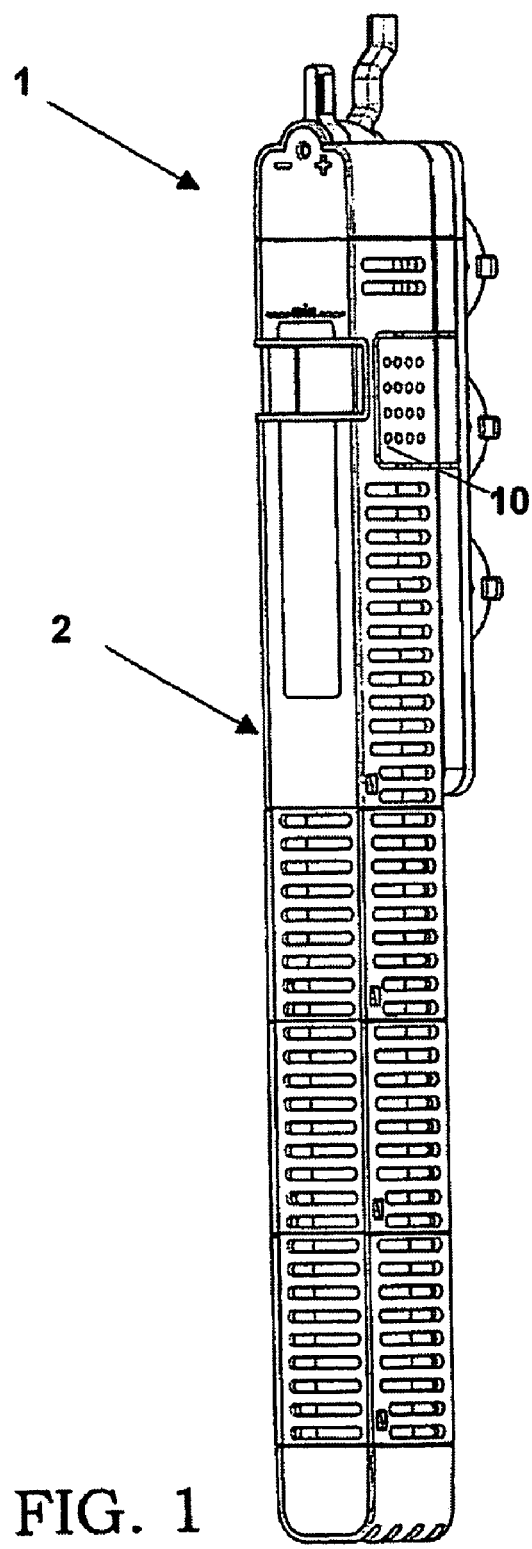
FIG. 1 shows a perspective front view of an accessory device assembly according to the invention.
Figure 2:
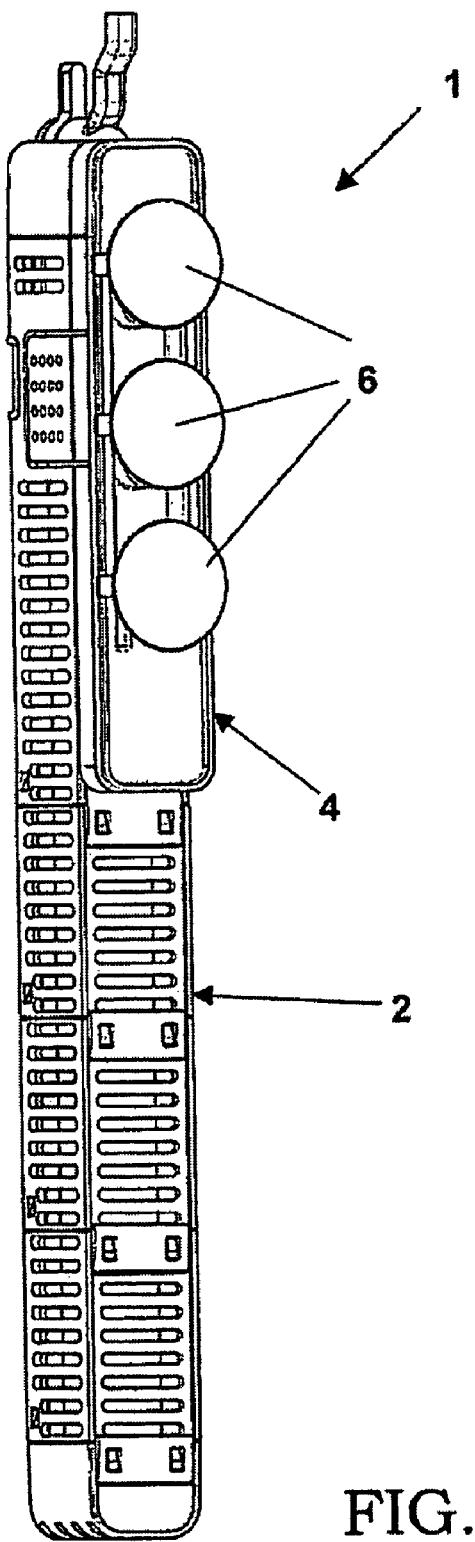
FIG. 2 shows a perspective rear view of accessory device assembly of FIG. 1.
Figure 3:
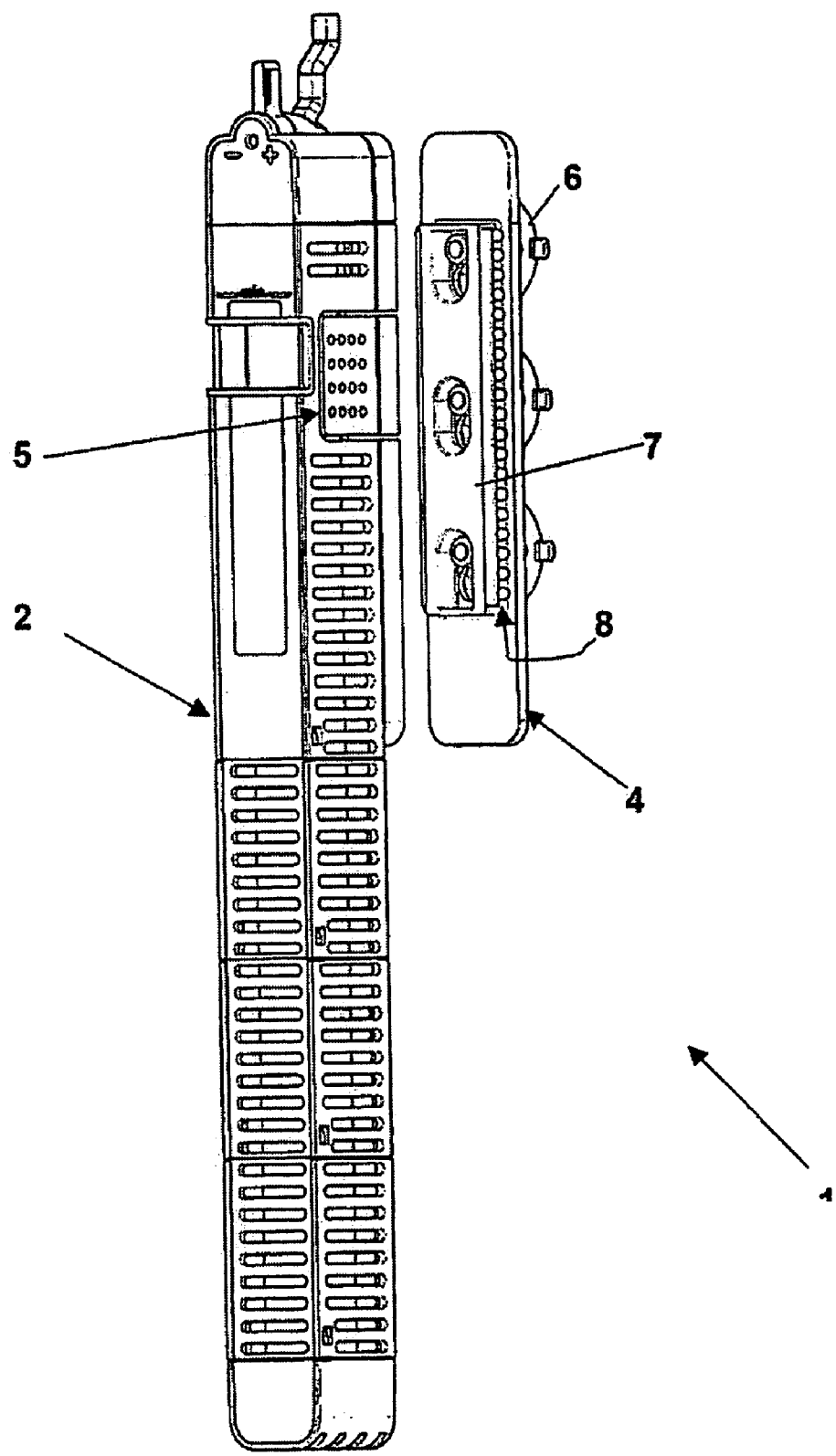
FIG. 3 shows a view similar to FIG. 1, but with separated parts.
Figure 4:
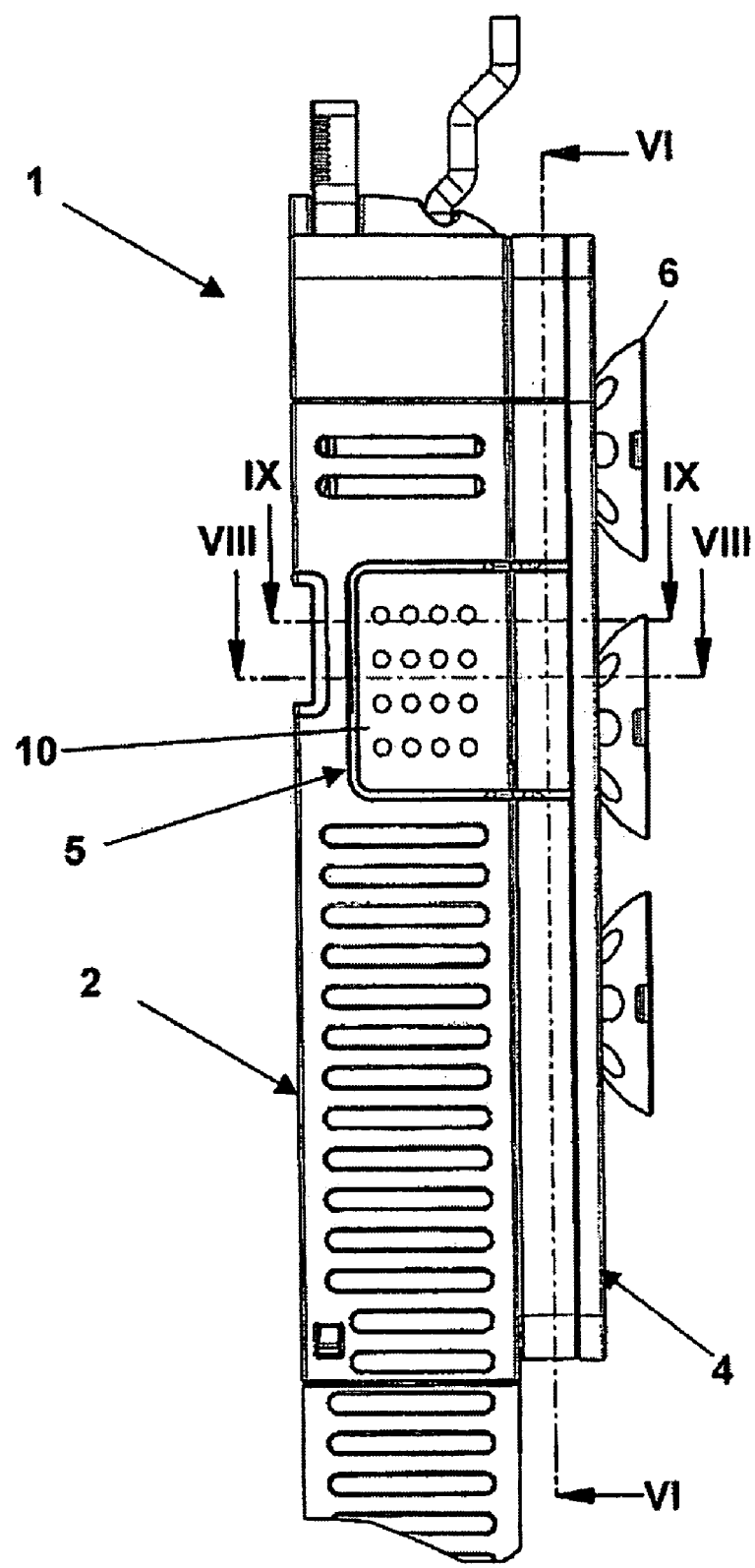
FIG. 4 shows a partial enlarged lateral view of accessory device assembly of FIG. 1.
Figure 7:
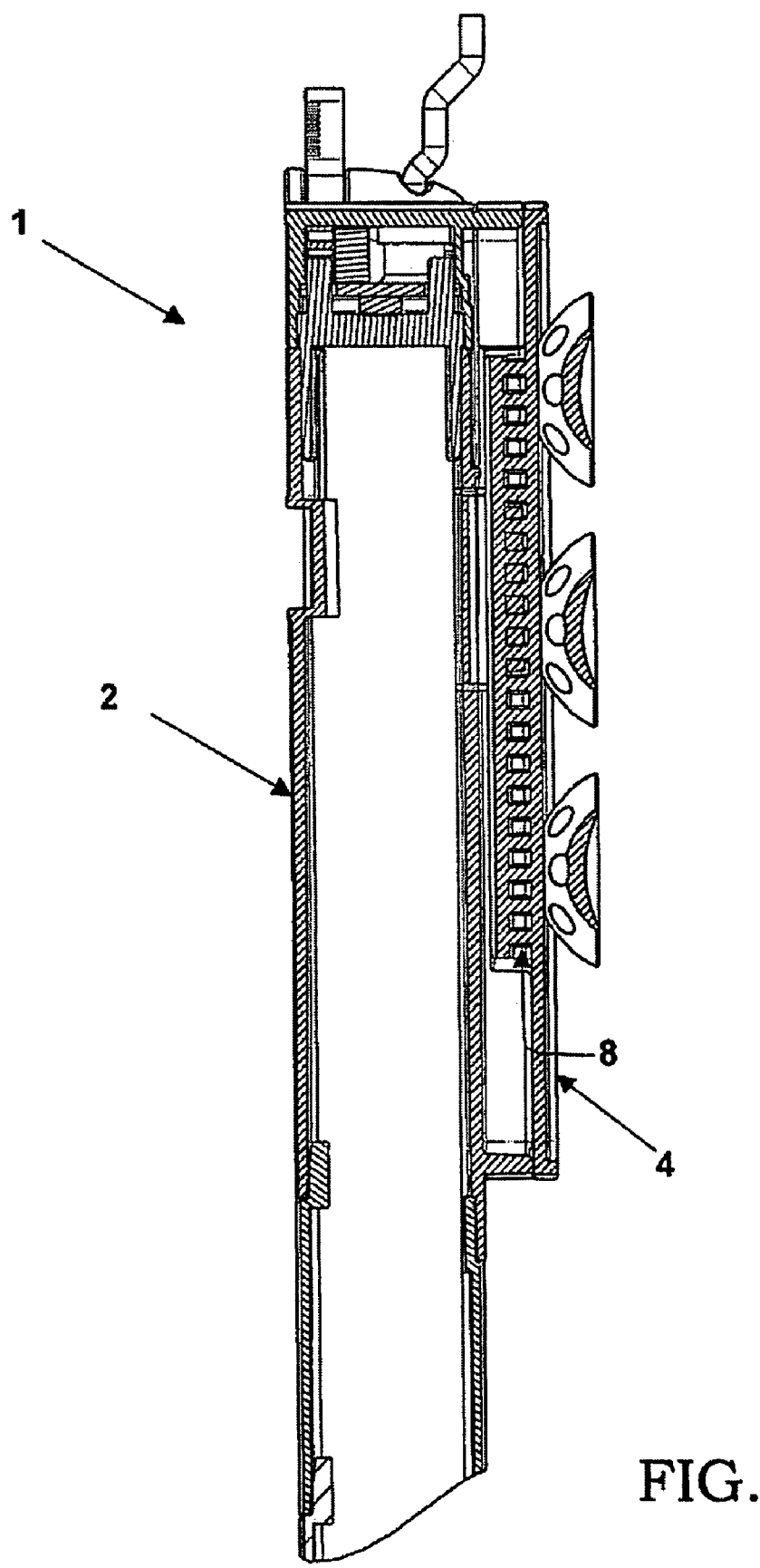
FIG. 7 shows a section view along line VII-VII of FIG. 5.
Figure 8:
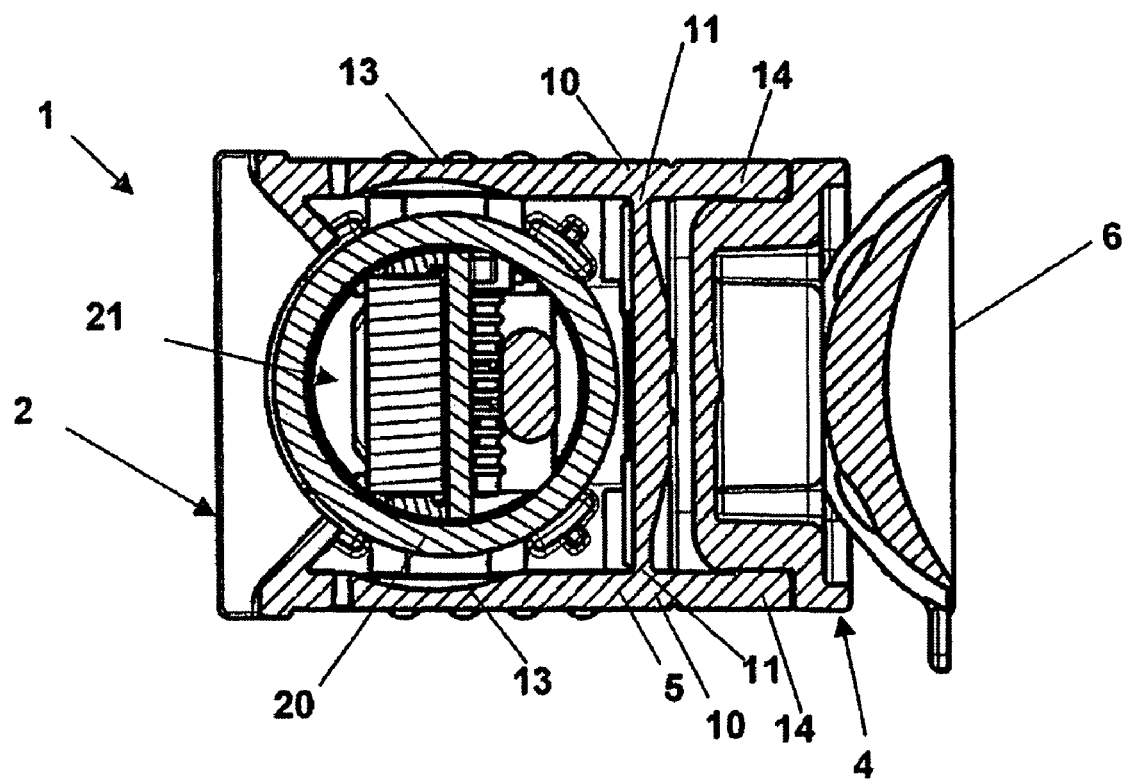
FIG. 8 shows a section view along line VII-VII of FIG. 4.
Figure 9:
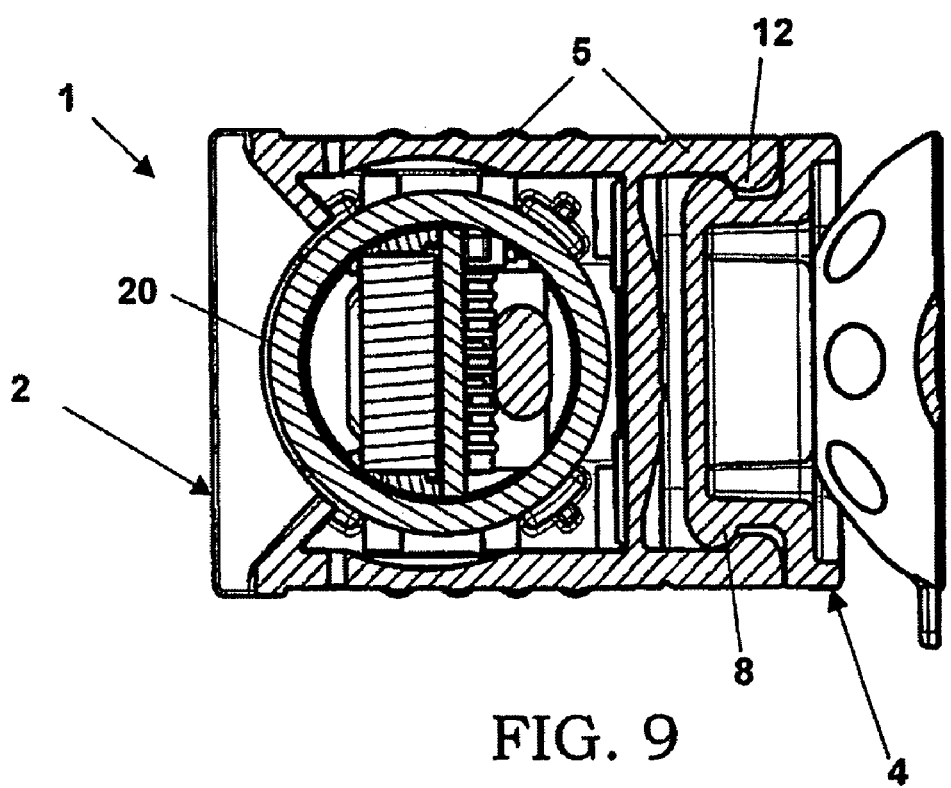
FIG. 9 shows a section view along line IX-IX of FIG. 4.
Figure 10:
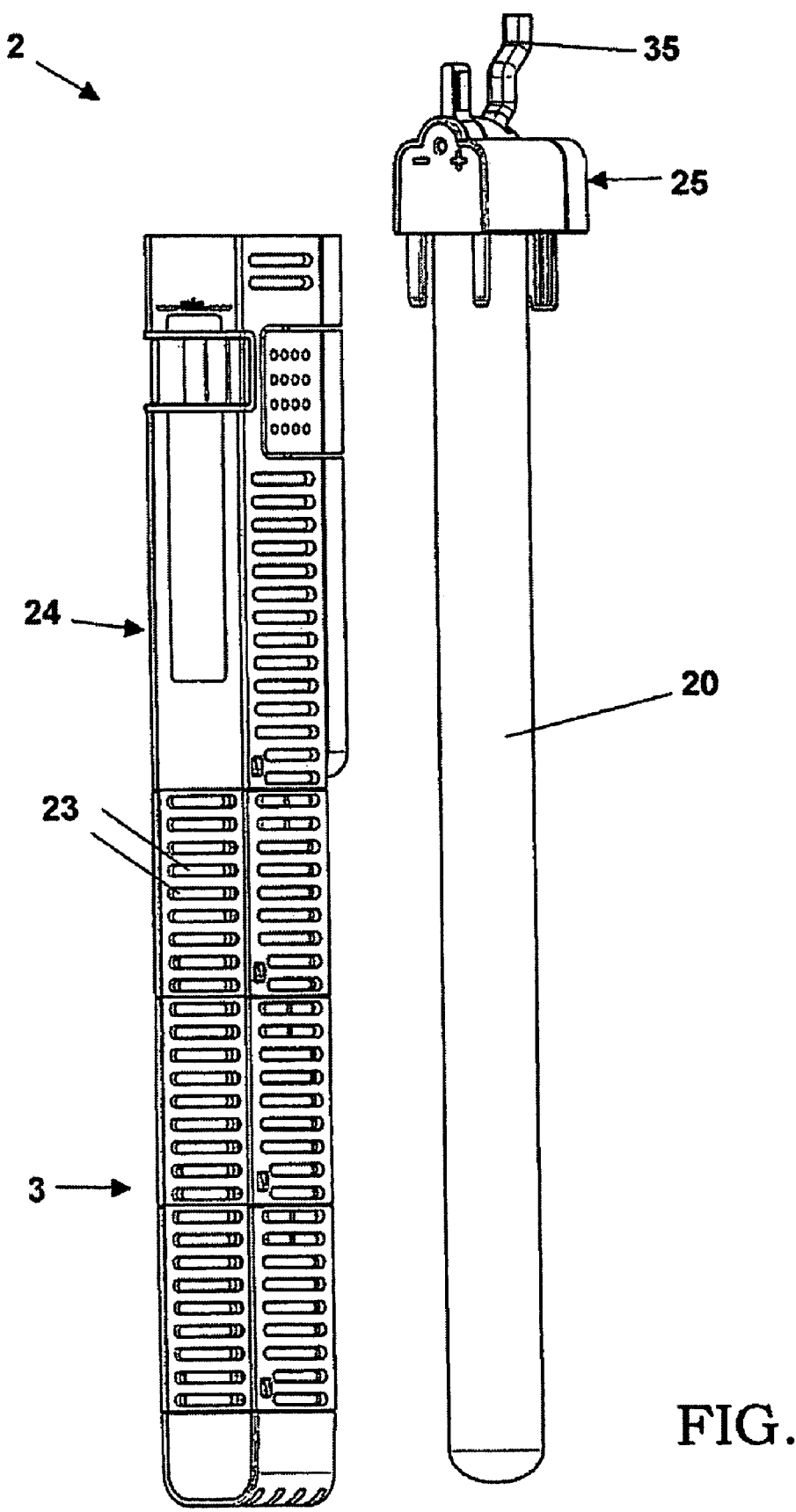
FIG. 10 shows a view of the internal part approaching the enclosure of the thermal heater comprised by the accessory device assembly of FIG. 1.
Figure 11:
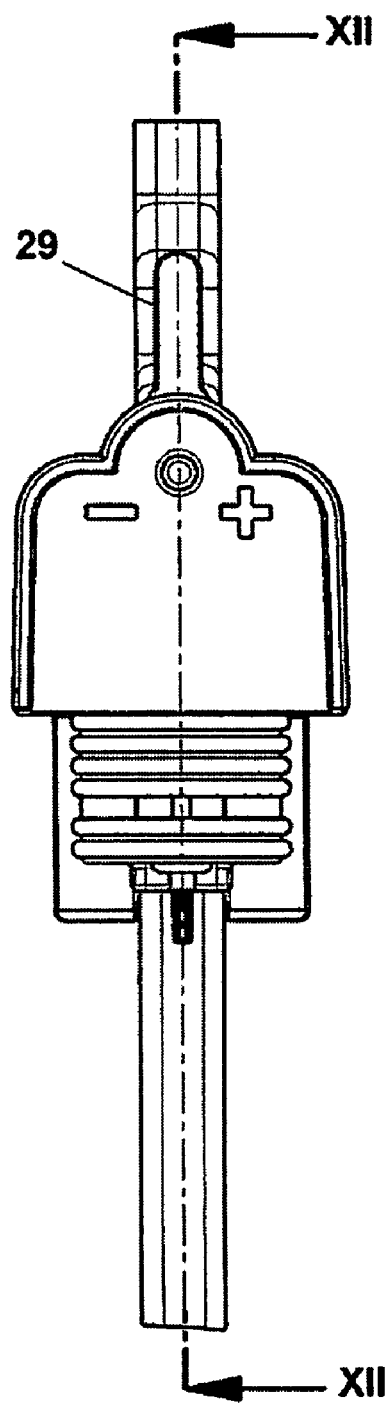
FIG. 11 shows a front view of a detail of thermal heater of FIG. 10.
Figure 12:
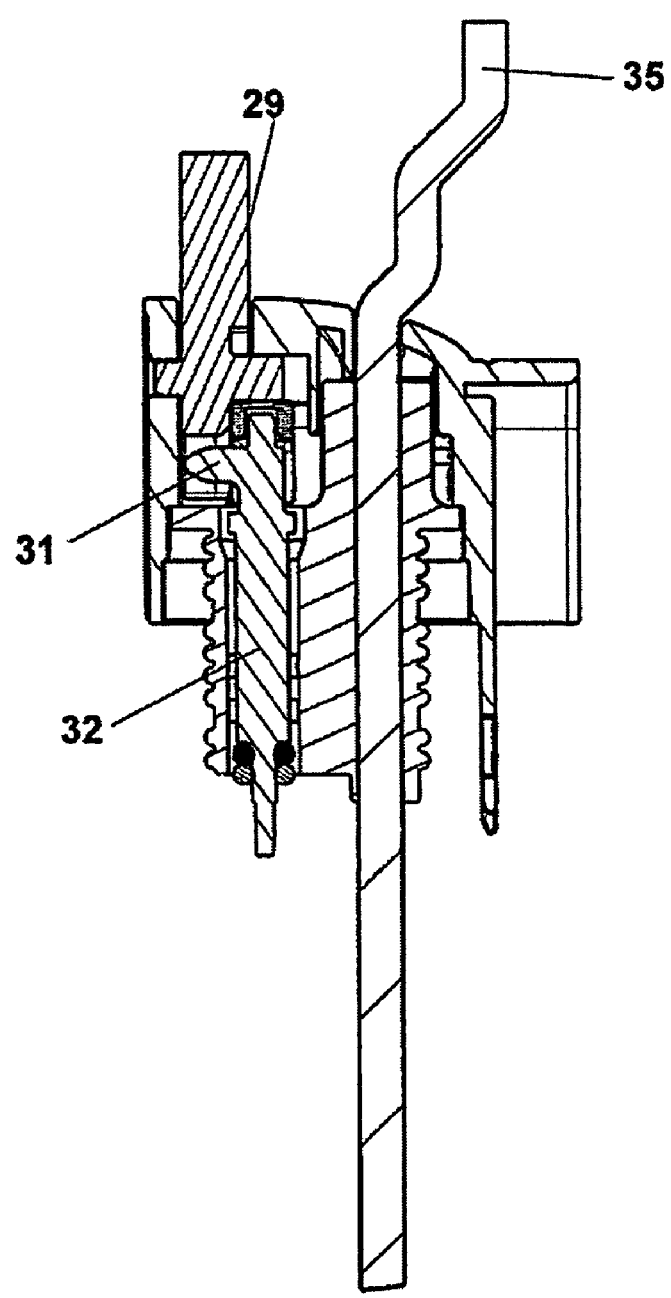
FIG. 12 shows a section view along line XII-XII of FIG. 11.
Figure 13:
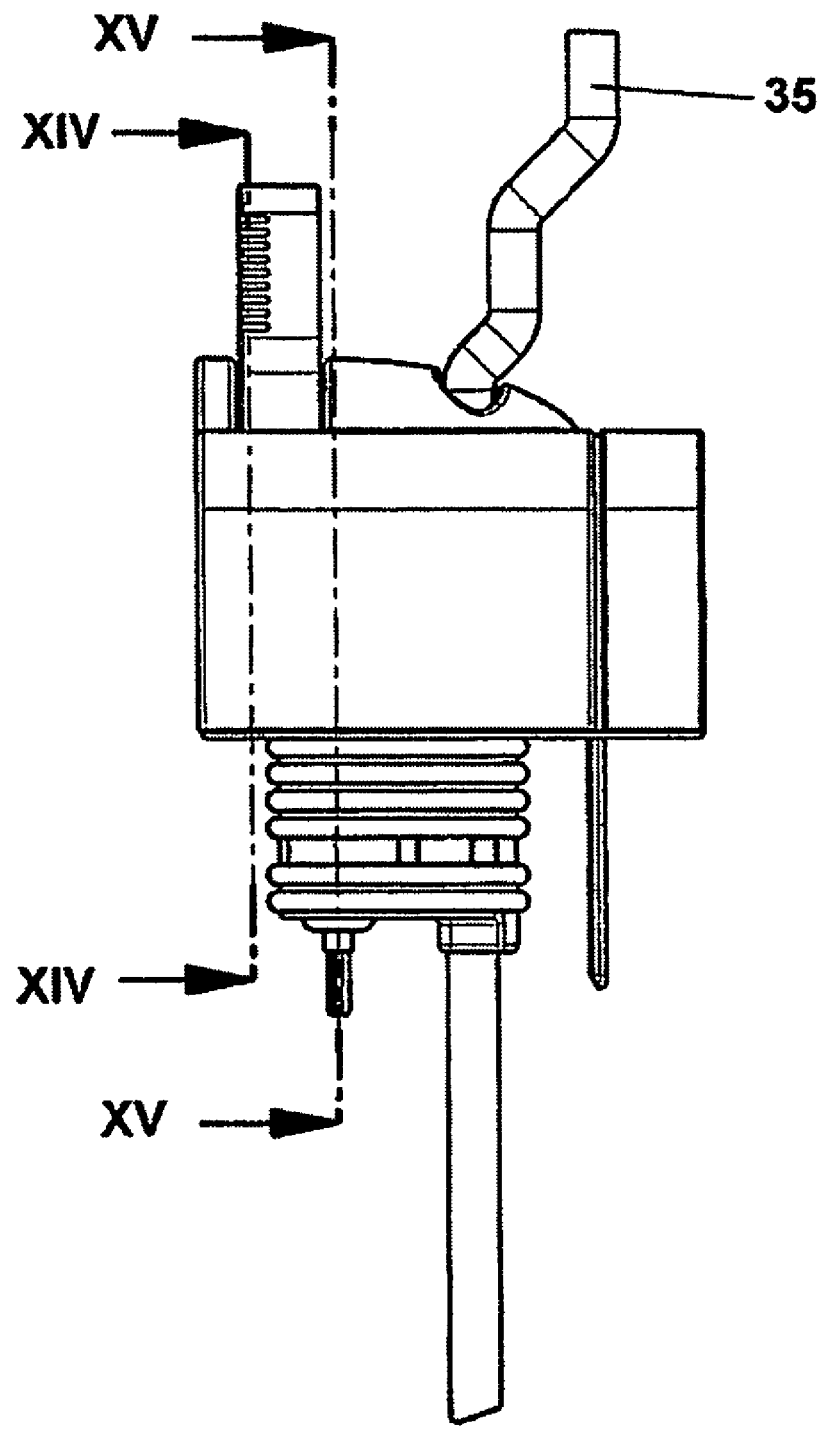
FIG. 13 shows a side view of detail of FIG. 11.
Figure 14:
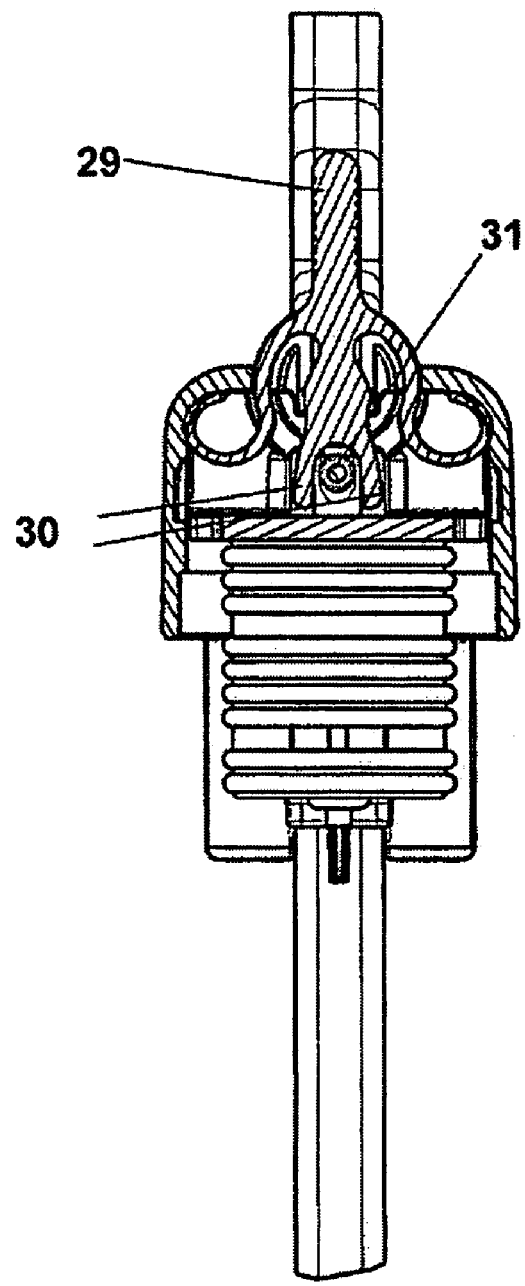
FIG. 14 shows a section view along line XIV-XIV of FIG. 13.
Figure 15:
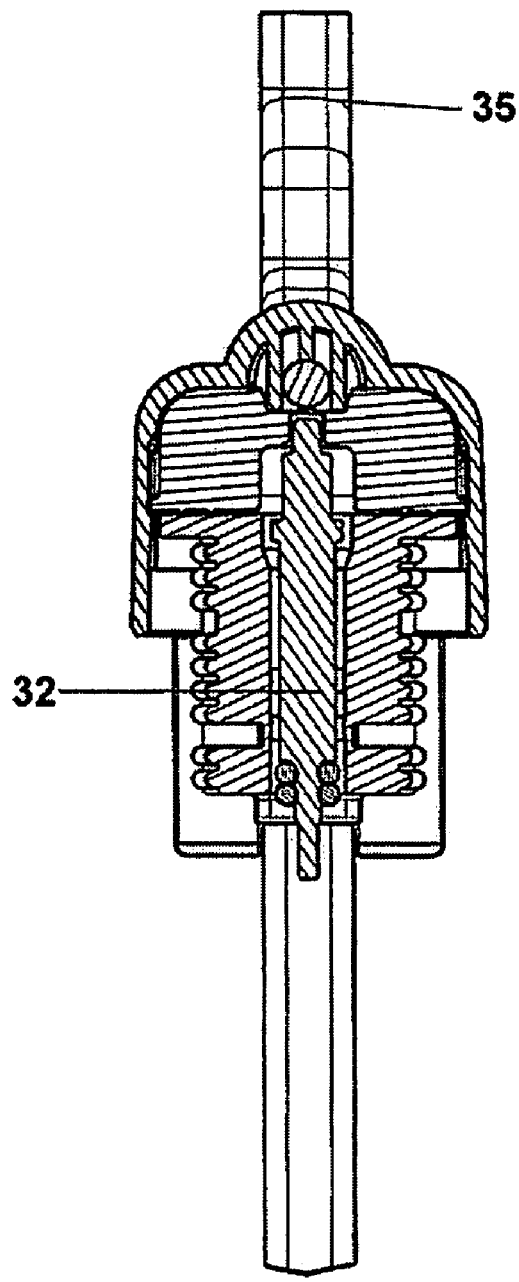
FIG. 15 shows a section view along line XV-XV of FIG. 13.

An accessory device assembly 1 comprises an accessory device, which, in its present embodiment, is formed by a thermal heater 2 (but it may also be some other accessory device for an aquarium), which is enclosed by an enclosure 3. In the following, the structure of the thermal heater 2 will be described in further detail.

The accessory device assembly 1 comprises supporting means for the thermal heater 2, which are able to support the thermal heater 2, on a wall portion of the aquarium, which is omitted since it's conventional. Said supporting means comprise:
- a supporting body 4, which is separate from thermal heater: it may be attached to a wall, in order to be supported;
- latching means 5, integral with the thermal heater 2 and removably attachable to the supporting body 4, so that the supporting body 4 is capable to support the thermal heater 2.

The supporting body 4 is formed by a rectangular plate, provided with beveled edges; it is supported by means of suction cups 6 attached on rear side.

Advantageously, the supporting body 4 comprises latching counter-means 8, comprised of supporting indentations provided with vertical rows of lateral protrusions (in the present embodiment, said lateral protrusions are provided integral with a plate-like base 7 of supporting body 4), said supporting indentations 8 being engageable by said latching means 5. The supporting indentations 8 have a vertical extension Hc.

The latching means 5 comprise two vertical parallel latching plates 10, each of them being provided with an internal latching surface with a latching indentation 12 complementarily shaped with respect to a corresponding supporting indentation 8 of supporting body. Each of said latching plates 10 is hinged to a pivot 11, formed by an elastically deformable bridge, integrally formed between the accessory device 3 and the latching plate 10; in this way, each latching plate 10 is composed of:
- a selection half-plate 13, which is shaped in a way to be grasped by a person's fingers,
- an opposed latching half-plate 14, wherein said latching indentations 12 are placed.

The half-plates are lever arms. The latching plates 10 are rotatable around respective pivots 11, against an elastic restoring force, which tends to force the latching plates 10 to return in a parallel position. In this way, a closing movement of said selection plates 13, brought about by human fingers, causes the latching plates 14 to diverge; moreover, once the selection plates 13 are released, the latching plates 10 turn back into their parallel positions.

Therefore, it is possible to provide the following:
- locking the thermal heater 2 to the supporting body 4, when the latching plates 10 are in parallel position and engaged with respective supporting indentations 8, so that the thermal heater 2 is supported by supporting body 4,
- latching/unlatching of latching plates 10 with respect to respective supporting indentation 8, when vertical latching plates are divergent, so that the thermal heater 2 are capable to be latched/unlatched with respect to supporting body 4.

Advantageously, vertical length Hc of supporting indentations 8 is greater than vertical length Hm of latching plates 10. Therefore, it is possible to define where is the appropriate latching position of latching plates.

In this way, advantageously, the user may choose to position its accessory device by latching it in a higher or lower position, according to his needs.

It is therefore possible to choose the vertical position of thermal heater 2 with respect to supporting body 4.

In this embodiment, thermal heater 2 internally comprises heating resistor means 21 (powered by electric wires contained in cables 35) for dissipating electric energy as heat, the resistor means being enclosed in a glass ampoule 20. Slots 23 are provided for allowing water to flow, at the same time preventing fish from passing through or human fingers from touching the ampoule 20.

The thermal heater 2 is a vertical oblong shaped body provided with a lower portion 24, for contacting the liquid, and an upper portion 25, comprising components, which should not come into contact with the fluid.

The upper portion 25 comprises electronic means for controlling operation of thermal heater; said control means being able to regulate operation of resistor (for example by regulating voltage at its terminal leads).

Figure 16:
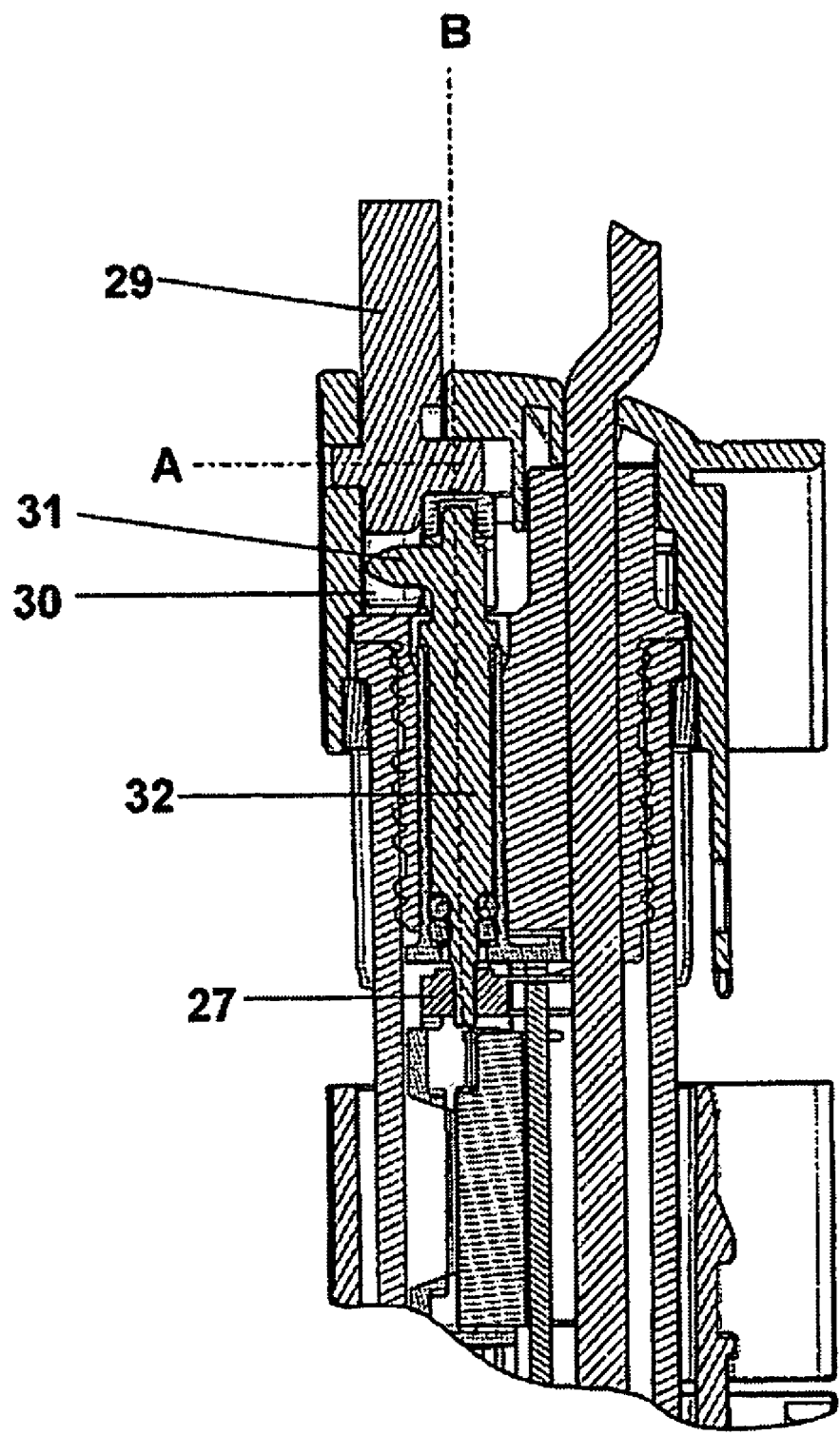
FIG. 16 shows a view similar to FIG. 12, but in more detail.
Figure 17:
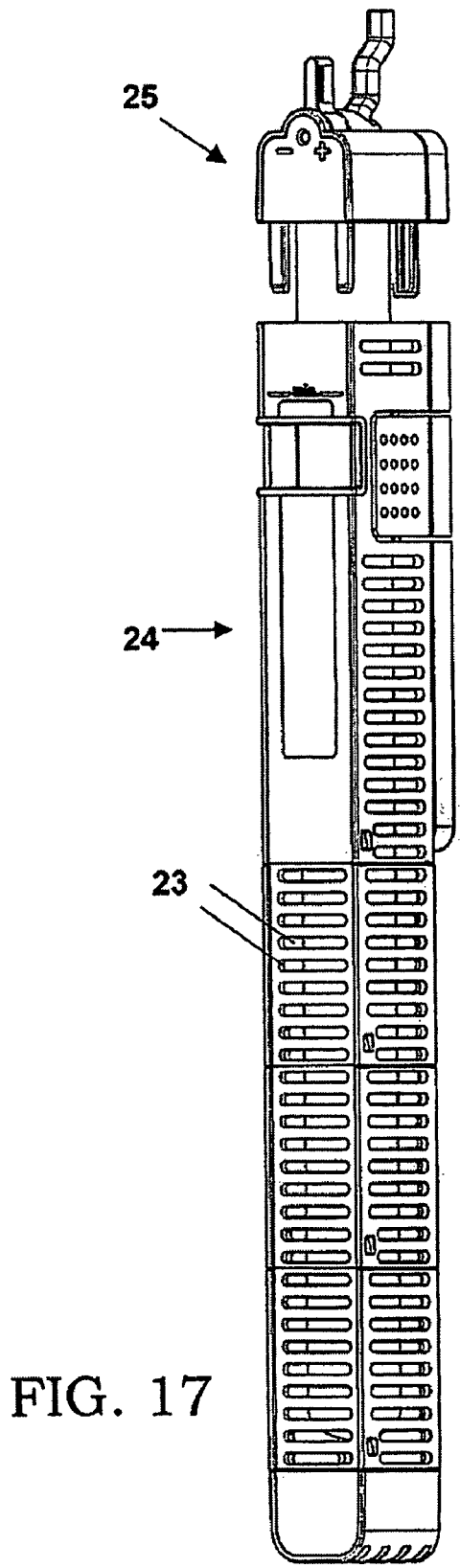
FIG. 17-19 show further views, with separated parts of thermal heater of FIG. 10.
Figure 18:
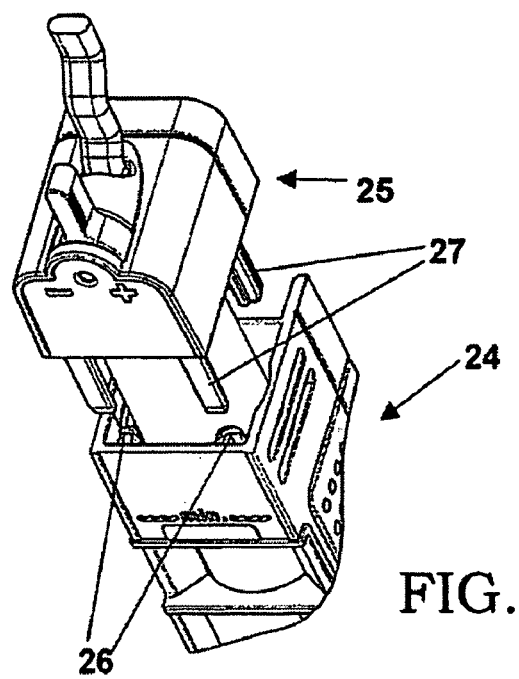
Figure 19:
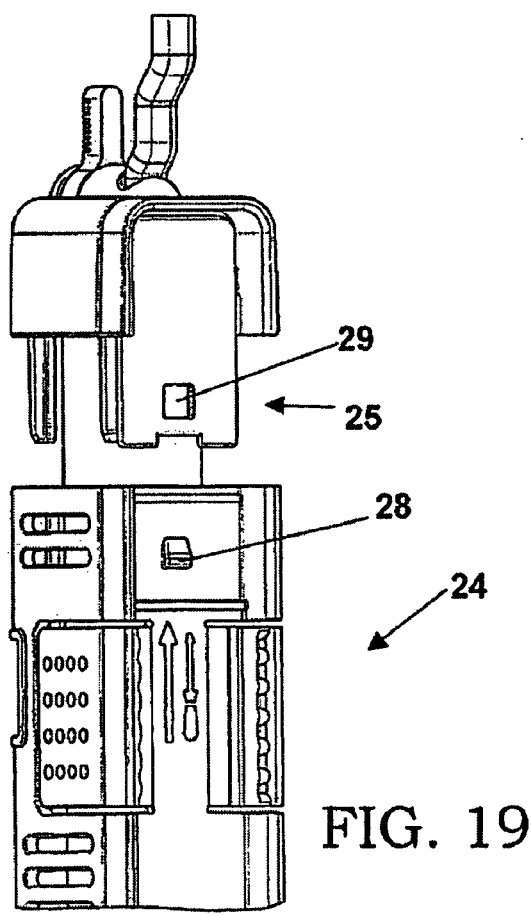

Means for controlling operation of thermal heater 2 are provided, said means allowing a person to set an increase or reduction of heat dissipation. Among these means, a control lever 29 is provided, which is normally in a vertical position, and which may be manually moved about a horizontal axis A between a maximum and minimum position, approximately at an angle of 45° with respect to the vertical axis, for controlling a trimmer 27 (shown only in FIG. 16) for converting the position of control lever 29 into electric signals sent to control means, for controlling operation of thermal heater 2.

Advantageously, control lever 29 is placed above water level, in order to prevent a user from contacting the liquid.

Control lever 29 comprises a bifurcation 30 which surrounds a horizontal protrusion 31 of a movement transmission means 32, which may be rotated about a vertical axis B.

An end protrusion of movement transmission means 32 slidingly and rotatably inserts into a horizontal cavity of trimmer 27.

In this way, when a finger rotates control lever in a certain direction, the bifurcation 30 pushes the horizontal protrusion 31, in order to rotate the movement transmission means 32, so that TRIMMER 27 senses a rotation and converts the rotation into electric signals for controlling thermal heater 2.

In the present embodiment, the upper portion 24 and lower portion 25 of thermal heater 2 are mutually engageable by means of vertical extensions 27 which are inserted into guides 26 and may be blocked by a vertical cam 28 snapping into a blocking cavity 29. The release of portions 24 and 25 is therefore accomplished by pushing or otherwise displacing the cam 28 and the blocking cavity 29, for example by using a tool; advantageously, an inexperienced user is therefore prevented from inadvertently releasing portions 24 and 25.

The major advantage of the present invention is the fact that the height of the position of accessory device may be adjusted, in order to allow positioning of accessory device at an optimal height.

Conveniently, the advantages related to stability obtainable by use of a supporting body firmly attached to a wall, for example by suction cups, which are optimal for holding it on a smooth wall, and the advantage related to the latching and unlatching of the latching means, are combined.

Advantageously, the latching plates, effectively formed by levers, allow an easy use by inexperienced users, too. Moreover, these plates, since they are made of plastic material integral with the pivot and the enclosure of the accessory device, provide an elastic return force without the need of additional elastic means.

Use of latching plates allow clamping of supporting body, which is otherwise not so readily accomplished.

The preferred embodiment of the present invention comprises a thermal heater, which requires a precise positioning of lower and upper portion for optimal operation.

The inventor is nonetheless aware that other embodiments may be advantageously used for other accessory devices for aquariums, like filters, lighting devices, etc.

The invention claimed is:

1. An accessory device assembly for an aquarium, said accessory device assembly comprising:
    an accessory device for aquarium operation; and
    supporting means for supporting and fixing said accessory device to a wall of the tank of said aquarium, wherein said supporting means comprise:
        a supporting body, which is separate and attachable to said wall;
        latching means integral with said accessory device and removably attachable to said supporting body; and
        latching counter-means provided on said supporting body which are engagable by said latching means of said accessory body such that said supporting body supports said latching means and said accessory device when said latching means and said latching counter-means are engaged, and such that a vertical position of said accessory device is adjustable with respect to said supporting body;
    wherein said latching counter-means comprise two vertical supporting indentations placed on a side of said supporting body,
    wherein said latching means comprise two vertical latching plates, normally in a parallel position, on which an elastic restoring force is exerted, which define two latching indentations complementarily shaped with respect to said supporting indentations,
    wherein said complementary supporting and latching indentations:
        lock said accessory device to said supporting body when said latching plates are in a parallel position and are attached to said latching counter-means, in order to allow said accessory device to be supported by said supporting body, and
        provide latching/unlatching of said latching means and said latching counter-means when said latching plates are in a diverging position, in order to allow said accessory device to be latched/unlatched to or from said supporting body.

2. The accessory device assembly according to claim 1, wherein said latching counter-means have a vertical length (Hc) substantially greater than a vertical length (Hm) of said latching means, so as to allow selection of a portion of latching counter-means and corresponding selection of vertical position of accessory device.

3. The accessory device assembly according to claim 1, wherein each of said latching plates is hinged to a respective pivot comprised of an elastically deformable bridge between said accessory device and the latching plate, wherein said pivots define, in said respective latching plate, a selection half-plate and an opposed latching half-plate, wherein an approaching movement of said selection half-plates entails a divergence of said latching half-plates, to allow said latching means to latch or unlatch with respect to said supporting body.

4. The accessory device assembly according to claim 1, wherein said supporting body is attachable to said wall of said aquarium by means of suction cups.

5. The accessory device assembly according to claim 1, wherein said accessory device comprises an enclosure of plastic material, which is rigidly fixed with at least part of said latching means.

6. The accessory device assembly according to claim 1, wherein said accessory device is a thermal heater for an aquarium.

7. The accessory device assembly according to claim 6, further comprising control input means for controlling operation of said heater, said control input means comprising a control lever which may be manually operated between a maximum position and a minimum position for controlling a trimmer, which can convert the position of said control lever into electric signals for controlling operation of said thermal heater, wherein said control lever may be rotated about a horizontal axis (A), said trimmer sensing rotations about a vertical axis (B).

8. The accessory device assembly according to claim 5, wherein said accessory device comprises a resistor for dissipating energy as heat, said resistor enclosed inside an ampoule positioned in said enclosure, said enclosure comprising slots for allowing liquid to pass, and
    wherein said accessory device comprises an upper portion and a lower portion, which are mutually engageable by means of vertical extensions insertable into guides and which are lockable by a vertical cam snapping into a blocking cavity.

9. The accessory device assembly according to claim 5, wherein said enclosure is integral with at least part of said latching means.

10. The accessory device assembly according to claim 8, wherein said vertical extensions are locked by said vertical cam snapping into said blocking cavity in such a way as to require a pushing action by means of a tool.

* * * * *